(12) United States Patent
Bell et al.

(10) Patent No.: US 10,272,790 B2
(45) Date of Patent: Apr. 30, 2019

(54) VEHICLE CHARGING SYSTEM

(71) Applicant: FORD GLOBAL TECHNOLOGIES, LLC, Dearborn, MI (US)

(72) Inventors: Christopher W. Bell, Livonia, MI (US); Frank Kallio, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/874,976

(22) Filed: Jan. 19, 2018

(65) Prior Publication Data

US 2018/0141445 A1 May 24, 2018

Related U.S. Application Data

(62) Division of application No. 14/189,090, filed on Feb. 25, 2014, now Pat. No. 9,908,423.

(51) Int. Cl.
*H02J 7/14* (2006.01)
*H02J 7/00* (2006.01)
*B60L 11/18* (2006.01)

(52) U.S. Cl.
CPC ......... *B60L 11/182* (2013.01); *B60L 11/1829* (2013.01); *B60L 11/1833* (2013.01); *B60L 11/1824* (2013.01); *B60L 11/1835* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
USPC ....... 320/108, 109, 107, 101, 104, 114, 132, 320/113, 115, 137, 167
See application file for complete search history.

(56) References Cited

U.S. PATENT DOCUMENTS

| | | | |
|---|---|---|---|
| 5,612,606 A * | 3/1997 | Guimarin | B60K 1/04 104/34 |
| 5,821,731 A * | 10/1998 | Kuki | B60L 11/1805 320/108 |
| 8,307,967 B2 | 11/2012 | Patwardhan | |
| 8,483,899 B2 | 7/2013 | Martin | |
| 8,513,915 B2 | 8/2013 | Patel | |
| 8,884,581 B2 | 11/2014 | Widmer et al. | |
| 2009/0153098 A1* | 6/2009 | Toya | H02J 7/025 320/108 |
| 2010/0225271 A1* | 9/2010 | Oyobe | B60L 5/005 320/108 |
| 2010/0315039 A1* | 12/2010 | Terao | H01F 38/14 320/108 |
| 2012/0262002 A1* | 10/2012 | Widmer | B60L 11/1829 307/104 |

(Continued)

FOREIGN PATENT DOCUMENTS

| | | |
|---|---|---|
| GB | 2471879 A | 1/2011 |
| WO | 2011116394 A1 | 9/2011 |
| WO | 2013003527 A1 | 1/2013 |

*Primary Examiner* — Alexis B Pacheco
(74) *Attorney, Agent, or Firm* — Carlson, Gaskey & Olds (57) ABSTRACT

A system includes a slidable bar, a connecting bar attached to the slidable bar, and a charging device carried by the connecting bar and movable with the slidable bar. The charging device may be automatically aligned to a receiving device of an electrified vehicle using motion of the electrified vehicle to move the charging device.

4 Claims, 6 Drawing Sheets

(56) References Cited

U.S. PATENT DOCUMENTS

| | | | |
|---|---|---|---|
| 2013/0038715 A1* | 2/2013 | Ichikawa | B60K 6/445 |
| | | | 348/118 |
| 2013/0076296 A1* | 3/2013 | Ushiroda | B60L 3/12 |
| | | | 320/101 |
| 2013/0249470 A1 | 9/2013 | Martin et al. | |
| 2013/0249682 A1 | 9/2013 | Van Wiemeersch et al. | |
| 2014/0167689 A1* | 6/2014 | Niizuma | H02J 50/12 |
| | | | 320/108 |
| 2014/0327391 A1* | 11/2014 | Niederhauser | B60L 11/182 |
| | | | 320/108 |
| 2014/0340027 A1* | 11/2014 | Keeling | B60L 11/1829 |
| | | | 320/108 |

* cited by examiner

VEHICLE CHARGING SYSTEM

CROSS REFERENCE TO RELATED APPLICATIONS

This is a divisional of U.S. patent application Ser. No. 14/189,090, which was filed on Feb. 25, 2014.

TECHNICAL FIELD

This disclosure relates to a charging system, and more particularly, but not exclusively, to an electrified vehicle charging system that includes an automatic alignment system.

BACKGROUND

Generally, electrified vehicles differ from conventional motor vehicles in that they are selectively driven using one or more battery powered electric machines. Conventional motor vehicles, by contrast, rely exclusively on an internal combustion engine to drive the vehicle. Electrified vehicles may use electric machines instead of, or in addition to, internal combustion engine. The electric machines are typically powered by high voltage batteries.

One barrier to adopting a more widespread use of electrified vehicles is the lack of supporting infrastructure for charging the high voltage batteries of the vehicles. Wireless charging systems are known that utilize electromagnetic fields to transfer energy between two objects. However, these systems require precise locating of a transmitting coil relative to a receiving coil that is mounted to the vehicle to ensure maximum power transfer between the coils.

SUMMARY

A system according to an exemplary aspect of the present disclosure includes, among other things, a slidable bar, a connecting bar attached to the slidable bar and a charging device carried by the connecting bar and movable with the slidable bar.

In a further non-limiting embodiment of the foregoing system, the slidable bar is movable relative to at least one slide rail.

In a further non-limiting embodiment of either of the foregoing systems, the at least one slide rail is mounted to a wheel plate assembly.

In a further non-limiting embodiment of any of the foregoing systems, the wheel plate assembly includes a first wheel plate, a second wheel plate and a base that connects between the first wheel plate and the second wheel plate.

In a further non-limiting embodiment of any of the foregoing systems, at least one wheel guide is mounted to the slidable bar.

In a further non-limiting embodiment of any of the foregoing systems, the at least one wheel guide includes a first wheel guide mounted to a first side of the slidable bar and a second wheel guide mounted to a second side of the slidable bar.

In a further non-limiting embodiment of any of the foregoing systems, the at least one wheel guide is curved in a direction toward the connecting bar.

In a further non-limiting embodiment of any of the foregoing systems, at least one wheel stop is mounted to the slidable bar.

In a further non-limiting embodiment of any of the foregoing systems, the charging device includes a coil pad that houses a transmitting coil.

In a further non-limiting embodiment of any of the foregoing systems, a visual target is positioned in front of the slidable bar.

In a further non-limiting embodiment of any of the foregoing systems, the charging device is movable in unison with the slidable bar to a position relative to a receiving device mounted to an electrified vehicle.

In a further non-limiting embodiment of any of the foregoing systems, the charging device is movable between a first position in which a transmitting coil of the charging device is offset from a receiving coil of the receiving device and a second position in which the transmitting coil is aligned with the receiving coil.

A vehicle charging system according to another exemplary aspect of the present disclosure includes, among other things, a charging device and an alignment system that includes at least one wheel guide that engages a wheel of an electrified vehicle to position the charging device relative to a receiving device of the electrified vehicle.

In a further non-limiting embodiment of the foregoing vehicle charging system, the alignment system includes a first wheel guide that engages a first wheel of the electrified vehicle and a second wheel guide that engages a second wheel of the electrified vehicle.

In a further non-limiting embodiment of either of the foregoing vehicle charging systems, the at least one wheel guide is curved to travel along an inner surface of the wheel.

In a further non-limiting embodiment of any of the foregoing vehicle charging systems, the alignment system includes a slidable bar and a connecting bar that extends from the slidable bar and carries the charging device.

In a further non-limiting embodiment of any of the foregoing vehicle charging systems, the at least one wheel guide includes a first wheel guide mounted to a first side of the slidable bar and a second wheel guide mounted to a second side of the slidable bar.

In a further non-limiting embodiment of any of the foregoing vehicle charging systems, the alignment system is pivotable about a locking pivot.

In a further non-limiting embodiment of any of the foregoing vehicle charging systems, the charging device is movable between a first position in which a transmitting coil of the charging device is offset from a receiving coil of the receiving device and a second position in which the transmitting coil is aligned with the receiving coil.

A method according to another exemplary aspect of the present disclosure includes, among other things, automatically aligning a charging device of a charging system relative to a receiving device of an electrified vehicle using motion of the electrified vehicle to move the charging device.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a charging system for wirelessly charging a battery of an electrified vehicle. The charging system includes an alignment system that is adapted to engage the electrified vehicle to accurately position a charging device in a charging position relative to the electrified vehicle. Once the charging device is properly positioned relative to a receiving coil mounted to the electrified vehicle, electrical energy is transferred from the charging device to the receiving coil. This electrical energy can subsequently be converted to electricity that is used to power and recharge the battery of the electrified vehicle. These and other features are discussed in greater detail herein.

Figure 1:
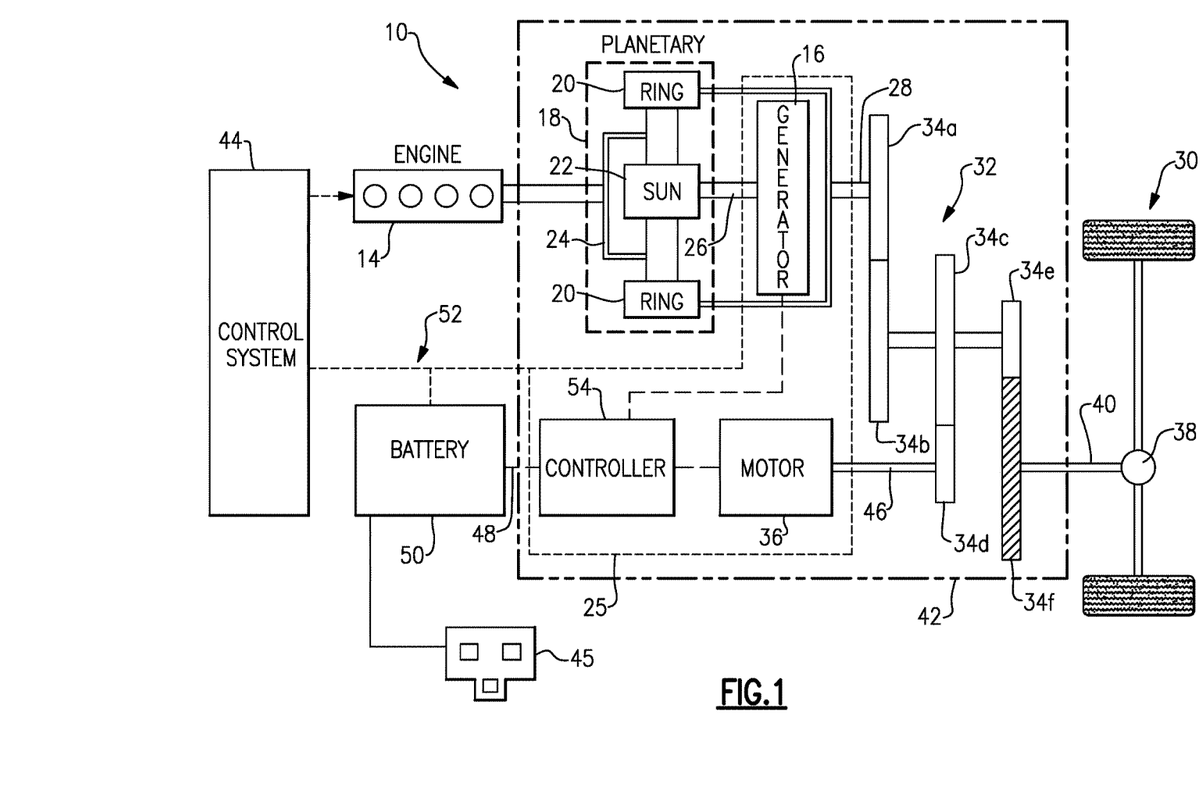
FIG. 1 schematically illustrates a powertrain of an electrified vehicle.

FIG. 1 schematically illustrates a powertrain 10 of an electrified vehicle 12. It should be understood that the concepts described herein are not limited to HEV's and could extend to other electrified vehicles, including but not limited to PHEV's.

In one embodiment, the powertrain 10 is a power split system that employs a first drive system that includes a combination of an engine 14 and a generator 16 (i.e., a first electric machine) and a second drive system that includes at least a motor 36 (i.e., a second electric machine), the generator 16 and a battery 50. For example, the motor 36, the generator 16 and the battery 50 may make up an electric drive system 25 of the powertrain 10. The first and second drive systems generate torque to drive one or more sets of vehicle drive wheels 30 of the electrified vehicle 12.

The engine 14, such as an internal combustion engine, and the generator 16 may be connected through a power transfer unit 18. In one non-limiting embodiment, the power transfer unit 18 is a planetary gear set. Of course, other types of power transfer units, including other gear sets and transmissions, may be used to connect the engine 14 to the generator 16. The power transfer unit 18 may include a ring gear 20, a sun gear 22 and a carrier assembly 24. The generator 16 is driven by the power transfer unit 18 when acting as a generator to convert kinetic energy to electrical energy. The generator 16 can alternatively function as a motor to convert electrical energy into kinetic energy, thereby outputting torque to a shaft 26 connected to the carrier assembly 24 of the power transfer unit 18. Because the generator 16 is operatively connected to the engine 14, the speed of the engine 14 can be controlled by the generator 16.

The ring gear 20 of the power transfer unit 18 may be connected to a shaft 28 that is connected to vehicle drive wheels 30 through a second power transfer unit 32. The second power transfer unit 32 may include a gear set having a plurality of gears 34A, 34B, 34C, 34D, 34E, and 34F. Other power transfer units may also be suitable. The gears 34A-34F transfer torque from the engine 14 to a differential 38 to provide traction to the vehicle drive wheels 30. The differential 38 may include a plurality of gears that enable the transfer of torque to the vehicle drive wheels 30. The second power transfer unit 32 is mechanically coupled to an axle 40 through the differential 38 to distribute torque to the vehicle drive wheels 30.

The motor 36 can also be employed to drive the vehicle drive wheels 30 by outputting torque to a shaft 46 that is also connected to the second power transfer unit 32. In one embodiment, the motor 36 and the generator 16 are part of a regenerative braking system in which both the motor 36 and the generator 16 can be employed as motors to output torque. For example, the motor 36 and the generator 16 can each output electrical power to a high voltage bus 48 and the battery 50.

The battery 50 may be a high voltage battery that is capable of outputting electrical power to operate the motor 36 and the generator 16. Other types of energy storage devices and/or output devices can also be incorporated for use by the electrified vehicle 12. In a non-limiting PHEV embodiment of the electrified vehicle 12, the battery 50 may be recharged or partially recharged using a charging adapter 45 that is connected to a charging station powered by an external power source, such as an electrical grid, a solar panel, or the like.

The motor 36, the generator 16, the power transfer unit 18, and the power transfer unit 32 may generally be referred to as a transaxle 42, or transmission, of the electrified vehicle 12. Thus, when a driver selects a particular shift position, the transaxle 42 is appropriately controlled to provide the corresponding gear for advancing the electrified vehicle 12 by providing traction to the vehicle drive wheels 30.

The powertrain 10 may additionally include a control system 44 for monitoring and/or controlling various aspects of the electrified vehicle 12. For example, the control system 44 may communicate with the electric drive system 25, the power transfer units 18, 32 or other components to monitor and/or control the electrified vehicle 12. The control system 44 includes electronics and/or software to perform the necessary control functions for operating the electrified vehicle 12. In one embodiment, the control system 44 is a combination vehicle system controller and powertrain control module (VSC/PCM). Although it is shown as a single hardware device, the control system 44 may include multiple controllers in the form of multiple hardware devices, or multiple software controllers within one or more hardware devices.

A controller area network (CAN) 52 allows the control system 44 to communicate with the transaxle 42. For example, the control system 44 may receive signals from the transaxle 42 to indicate whether a transition between shift positions is occurring. The control system 44 could also communicate with a battery control module of the battery 50, or other control devices.

Additionally, the electric drive system 25 may include one or more controllers 54, such as an inverter system controller (ISC). The controller 54 is configured to control specific components within the transaxle 42, such as the generator 16 and/or the motor 36, such as for supporting bidirectional power flow. In one embodiment, the controller 54 is an inverter system controller combined with a variable voltage converter (ISC/VVC).

In one non-limiting embodiment, the electrified vehicle 12 has two basic operating modes. The electrified vehicle 12 may operate in an Electric Vehicle (EV) mode where the motor 36 is used (generally without assistance from the engine 14) for vehicle propulsion, thereby depleting the battery 50 state of charge up to its maximum allowable discharging rate under certain driving patterns/cycles. The EV mode is an example of a charge depleting mode of operation for the electrified vehicle 12. During EV mode, the state of charge of the battery 50 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 36 are both used for vehicle propulsion. The HEV mode is an example of a charge sustaining mode of operation for the electrified vehicle 12. During the HEV mode, the electrified vehicle 12 may reduce the motor 36 propulsion usage in order to maintain the state of charge of the battery 50 at a constant or approximately constant level by increasing the engine 14 propulsion usage. The electrified vehicle 12 may be operated in other operating modes in addition to the EV and HEV modes.

It may be desirable to wirelessly charge the battery 50 of the electrified vehicle 12. Exemplary charging systems for achieving this purpose are described in greater detail below.

Figure 2:
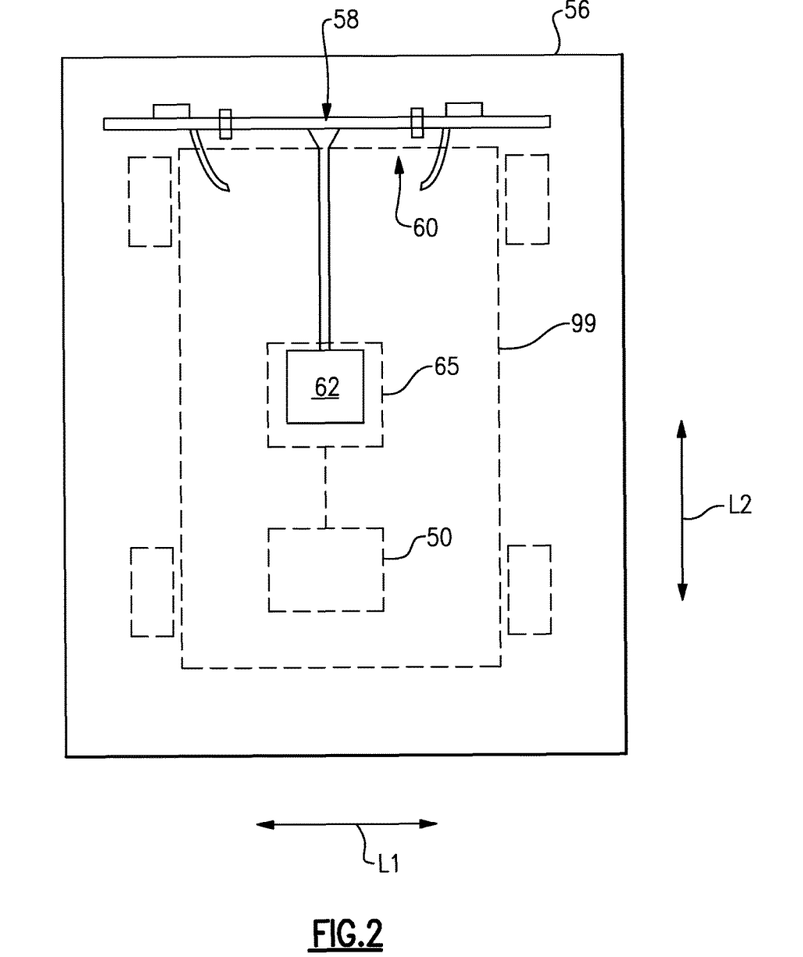
FIG. 2 illustrates a parking space equipped with a vehicle charging system.

FIG. 2 schematically illustrates a parking space 56. The parking space 56 may be located in a parking lot, a garage, a driveway or at any other surface where a vehicle 99 is parked. The vehicle 99 could be any type of electrified vehicle, including but not limited to the electrified vehicle 12 of FIG. 1. The parking space 56 is equipped with a charging system 58 that is adapted to wirelessly charge a battery 50 of the vehicle 99.

In one embodiment, the charging system 58 includes an alignment system 60 for accurately positioning a charging device 62 relative to the vehicle 99. As is discussed in greater detail below, the alignment system 60 may automatically move the charging device 62 in a lateral direction L1 in order to position the charging device 62 relative to a receiving device 65 that is mounted to the vehicle 99.

As known, proper alignment of the charging device 62 relative to the receiving device 65 is necessary to wirelessly transmit electromagnetic energy between the devices. The electrical energy that is wirelessly transferred to the receiving device 65 of the vehicle 99 may be converted into electricity for powering and/or charging the battery 50.

Figure 3:
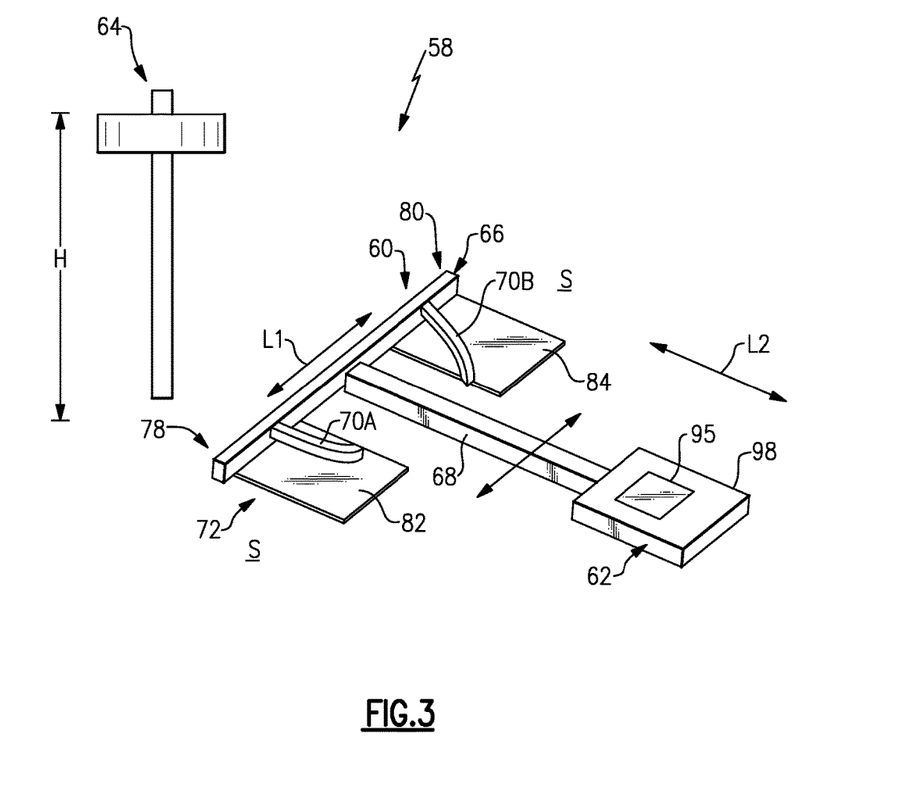
FIG. 3 illustrates a perspective view of a vehicle charging system.
Figure 4:
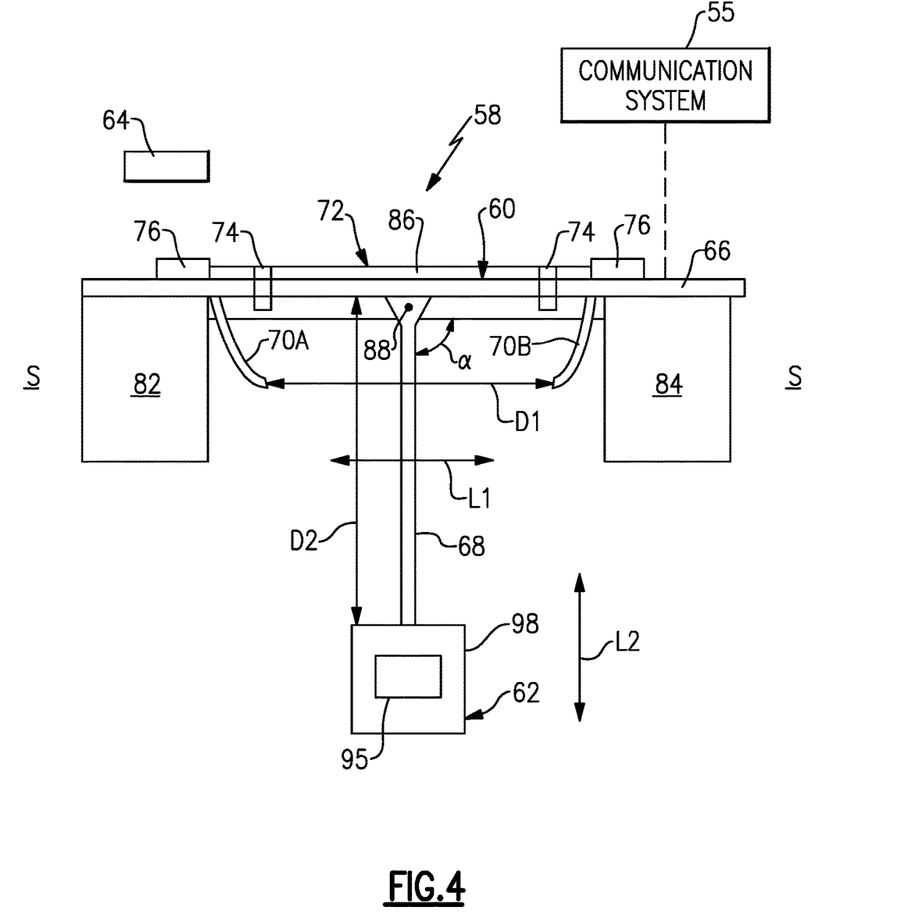
FIG. 4 illustrates a top view of a vehicle charging system.

FIGS. 3 and 4 illustrate an exemplary charging system 58 for wirelessly charging a high voltage battery of an electrified vehicle. The charging system 58 may include a visual target 64, an alignment system 60 and a charging device 62. In one embodiment, the visual target 64 is separated from the alignment system 60 and may be positioned laterally in front of the alignment system 60 (i.e., forward of the alignment system 60 in a direction away from a parked vehicle).

The visual target 64 may extend to a height H (see FIG. 3) that is tall enough to be visible by a vehicle driver. In one non-limiting embodiment, the visual target 64 is positioned directly in front of a driver seat of the electrified vehicle (see also FIG. 5A). This positioning substantially reduces any parallax error that may arise as the vehicle is parked. As discussed below with respect to FIGS. 5A and 5B, the vehicle driver may utilize the visual target 64 to properly orient the electrified vehicle relative to the charging system 58.

The alignment system 60 may include a slidable bar 66, a connecting bar 68, one or more wheel guides 70, and a wheel plate assembly 72. The slidable bar 66 is movable in lateral directions L1 (i.e., to the left or to the right) relative to one or more slide rails 74. Two slide rails are illustrated in FIG. 4; however, the alignment system 60 could employ any number of slide rails 74. The slide rails 74 are stationary and may be mounted to the wheel plate assembly 72, which acts as a base of the charging system 58. In one embodiment, the slide rails 74 include ball bearing arrangements such that the slidable bar 66 glides smoothly in the lateral directions L1 within the slide rails 74.

The slidable bar 66 may additionally be equipped with one or more wheel stops 76 (see FIG. 4). The wheel stops 76 represent obstacles that are positioned to stop the forward motion (in longitudinal direction L2) of a parking vehicle. In one non-limiting embodiment, the wheel stops 76 are triangular shaped and extend to a height above the slidable bar 66 (see, for example, FIG. 5A). However, the wheel stops 76 could include any size or shape and could be positioned at any location of the slidable bar 66 to inhibit the forward motion of a vehicle.

The connecting bar 68 may be attached to the slidable bar 66 and carries the charging device 62 at an end opposite from the slidable bar 66. Accordingly, movement of the slidable bar 66 also moves the connecting bar 68 and the charging device 62. In other words, the charging device 62 moves in unison with the slidable bar 66. In one embodiment, the connecting bar 68 is transverse to the slidable bar 66. In still another embodiment, the connecting bar 68 is perpendicular to the slidable bar 66.

The wheel guides 70 are mounted to the slidable bar 66 and extend in the same direction from the slidable bar 66 as the connecting bar 68. The wheel guides 70 may be curved in a direction toward the connecting bar 68. In other words, in one exemplary implementation, the wheel guides 70 are curved bars.

In one non-limiting embodiment, a first wheel guide 70A is mounted at a first side 78 of the slidable bar 66 and a second wheel guide 70B is mounted at a second side 80 of the slidable bar 66. The first and second wheel guides 70A, 70B may engage opposing wheels of a vehicle. For example, as the vehicle wheels contact and move relative to the wheel guides 70A, 70B, the slidable bar 66 slides relative to the slide rails 74 to force the wheel guides 70A, 70B into alignment with the wheels. Therefore, the alignment system 60 can automatically locate the charging device 62 at a charging position relative to the vehicle in response to engaging the wheels of the vehicle with the wheel guides 70A, 70B. In other words, via the wheel guides 70A, 70B of the alignment system 60, the charging system 58 is automatically self-located at a precise location relative to the vehicle in order to charge a battery of the vehicle.

The wheel guides 70A, 70B may be spaced by a distance D1 and the charging device 62 may be positioned at a distance D2 from the slidable bar 66 (see FIG. 4). The distances D1, D2 can be set during installation of the charging system 58 to accommodate a specific vehicle having specific wheel-to-wheel dimensions and a specifically located receiving device (such that includes a receiving coil). This particular arrangement may be suitable for home use of the charging system 58.

Alternatively, the charging system 58 can be adapted to provide automatic positioning of the distances D1, D2. Automatic positioning may be particularly suited for use in parking lots where different vehicles are charged using the charging system 58. For example, the charging system 58 could include a communication system 55 (see FIG. 4), such as a Wi-Fi system, cellular system or the like, that can communicate with a vehicle to obtain vehicle data (wheel-to-wheel dimensions, etc.) and automatically set the distances D1, D2 as necessary to accommodate that particular vehicle.

The wheel plate assembly 72 of the alignment system 60 may include a first wheel plate 82 and a second wheel plate 84. A base 86 may extend between the first wheel plate 82 and the second wheel plate 84 (see FIG. 4). In one embodiment, the slide rails 74 are mounted to the base 86. Each of the first wheel plate 82, the second wheel plate 84 and the base 86 are in direct contact with a surface S of a parking space, in one embodiment.

As a vehicle approaches the charging system 58, the vehicle wheels may ride onto the first wheel plate 82 and the second wheel plate 84. The charging system 58 is not be pushed away from the approaching vehicle even though it may contact portions of the vehicle because the vehicle wheels ride on top of the first wheel plate 82 and the second wheel plate 84 to hold its positioning. Therefore, the energy created by movement of the oncoming vehicle is used to align the wheel guides 70A, 70B relative to the vehicle wheels. In this way, the charging system 58 may be installed and used without the need to hard mount the system to the surface S, thereby reducing installation costs and increasing reusability.

The alignment system 60 may additionally include a locking pivot 88 (see FIG. 4). In one non-limiting embodiment, the charging system 58 is pivotable about the locking pivot 88 to change a rotational positioning a of the charging system 58 relative to the surface S. The locking pivot 88 may be selectively released to rotate the charging system 58. For example, the charging system 58 may need rotated relative to an oncoming vehicle in order to better align the charging system 58 relative to the vehicle.

In one non-limiting device, the charging device 62 is an inductive charging device. Other types of wireless charging systems are also contemplated as within the scope of this disclosure. The charging device 62 may include a coil pad 98 that houses a transmitting coil 95. The charging device 62 could additionally include other components necessary to wirelessly transmit energy to a nearby device, such as a receiving device that is mounted to the vehicle that requires charging.

Figure 5A:
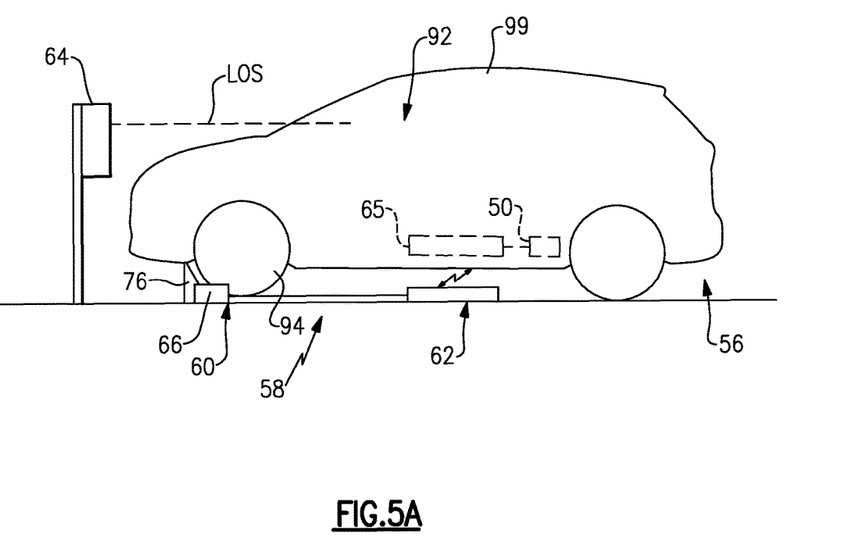
FIGS. 5A and 5B schematically illustrate a vehicle charging method according to one non-limiting embodiment of this disclosure.
Figure 5B:
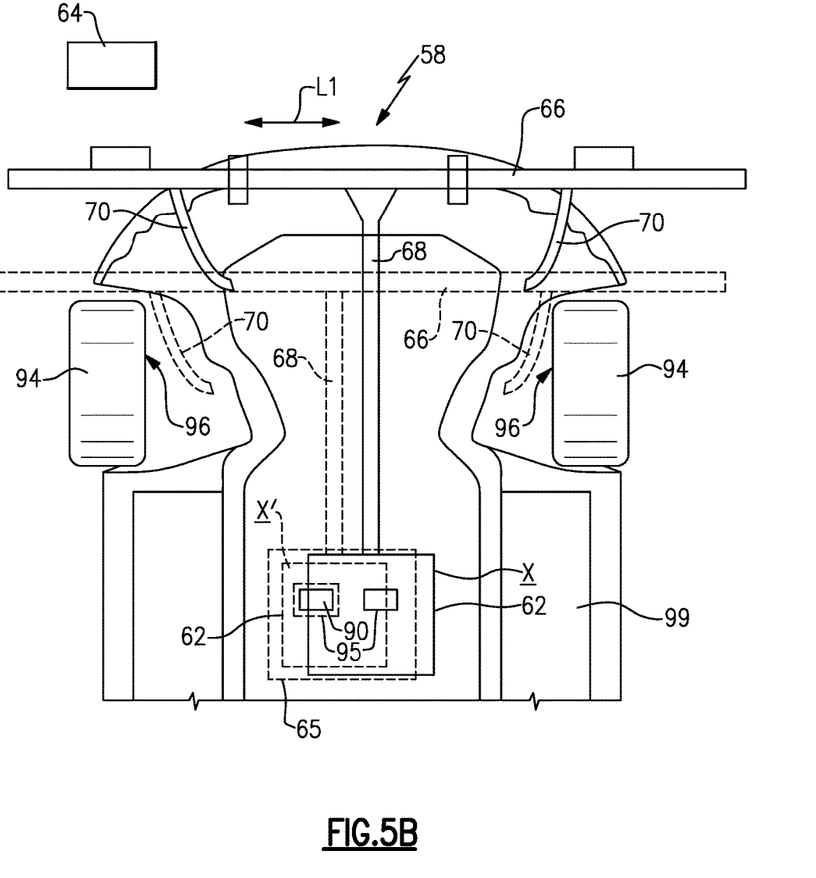

FIGS. 5A and 5B schematically illustrate a vehicle charging method that may employ the charging system 58 described above (see FIGS. 3 and 4) to automatically align a charging device 62 relative to a receiving device 65 of a vehicle 99 to wirelessly charge a battery 50 of the vehicle 99. Although the battery 50 is shown connected to the receiving device 65 in this embodiment, it should be understood that other components could be positioned therebetween for converting the electrical energy received by the receiving device 65 into electricity that can be used to power and/or recharge the battery 50.

Referring first to FIG. 5A, the exemplary vehicle charging method begins when the electrified vehicle 99 enters a parking space 56 that is equipped with the charging system 58. As the vehicle 99 enters the parking space 56, the vehicle driver may utilize the visual target 64 to guide the vehicle 99 into a proper orientation relative to the alignment system 60 of the charging system 58. In one non-limiting embodiment, the visual target 64 is positioned in a direct line of sight LOS in front of a driver side 92 of the vehicle 99. This positioning may reduce the onset of parallax error that may otherwise occur as the vehicle enters the parking space 56. The vehicle 99 may be driven longitudinally forward until the vehicle wheels 94 abut the wheel stops 76 of the charging system 58, indicating that the vehicle 99 has reached a proper longitudinal positioning relative to the charging system 58.

Referring now to FIG. 5B, as the vehicle 99 is moved longitudinally forward in a direction toward the visual target 64, the wheel guides 70 of the alignment system 60 may engage the vehicle wheels 94. The wheel guides 70 may glide or otherwise travel along an inner surface 96 of the vehicle wheels 94 as the vehicle 99 continues to approach the visual target 64. As the wheel guides 70 engage the vehicle wheels 94, the slidable bar 66 of the alignment system 60 may move in the lateral directions L1 (left or right) to position the charging device 62 at a charging position relative to the vehicle 99. In other words, in one non-limiting embodiment, the charging device 62 is automatically aligned relative to the receiving device 65 using the motion of the vehicle 99 to move the charging device 62 (via the slidable bar 66).

In one non-limiting embodiment, movement of the slidable bar 66 moves the connecting bar 68 and the attached charging device 62 between a first position X in which a transmitting coil 95 of the charging device 62 is offset from a receiving coil 90 of the receiving device 65 of the vehicle 99, and a second position X' (shown in phantom lines) in which the transmitting coil 95 is aligned with the receiving coil 90 such that power may be wirelessly transferred from the transmitting coil 95 to the receiving coil 90. For example, proper alignment may be achieved when the receiving coil 90 is located directly above the transmitting coil 95. Once properly aligned, an electromagnetic field is produced between the transmitting coil 95 and the receiving coil 90 such that electrical energy may be transferred to the receiving device 65. The electrical energy may subsequently be used to charge the battery 50.

The charging system and method described herein provide precise locating of a charging device both laterally and longitudinally relative to a vehicle in a hands-free manner. The proposed alignment system uses a single moving part and includes no electronics, is robust, and provides repeatable results.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A method, comprising:
automatically aligning a charging device of a charging system relative to a receiving device of an electrified vehicle using motion of the electrified vehicle to move the charging device, wherein automatically aligning the charging device includes engaging wheel guides of the charging system along inner surfaces of wheels of the electrified vehicle as the electrified vehicle is moved in a direction toward the charging system; and moving a slidable bar in a lateral direction as the wheel guides engage the inner surfaces of the wheels to position the charging device over top of the receiving device.

2. The method as recited in claim 1, comprising a connecting bar that extends from the slidable bar and carries the charging device.

3. The method as recited in claim 2, wherein the charging device is fixed relative to the connecting bar and is positioned on an opposite end of the connecting bar from the slidable bar.

4. The method as recited in claim 1, wherein movement of the slidable bar moves the charging device between a first position in which a transmission coil of the charging device is offset from a receiving coil of the receiving device and a second position in which the transmitting coil is aligned with the receiving coil such that power may be wirelessly transferred from the transmitting coil to the receiving coil.

* * * * *